United States Patent
Yagisawa et al.

(10) Patent No.: US 7,383,361 B2
(45) Date of Patent: Jun. 3, 2008

(54) DISK ARRAY SYSTEM AND INTERFACE CONVERTER

(75) Inventors: Ikuya Yagisawa, Tokyo (JP); Yutaka Nakagawa, Yokohama (JP); Azuma Kano, Odawara (JP)

(73) Assignee: Hitachi, Ltd., Tokyo (JP)

( * ) Notice: Subject to any disclaimer, the term of this patent is extended or adjusted under 35 U.S.C. 154(b) by 220 days.

(21) Appl. No.: 11/298,715

(22) Filed: Dec. 12, 2005

(65) Prior Publication Data
US 2006/0095813 A1 May 4, 2006

Related U.S. Application Data

(63) Continuation of application No. 10/861,792, filed on Jun. 7, 2004, now Pat. No. 7,080,167.

(30) Foreign Application Priority Data

Dec. 16, 2003 (JP) ............... 2003-417521

(51) Int. Cl.
*G06F 3/00* (2006.01)
(52) U.S. Cl. ............... 710/15; 710/18; 711/111; 711/114; 711/147; 711/148; 711/167
(58) Field of Classification Search ............ 710/15, 710/18; 711/111, 114, 147, 148, 167
See application file for complete search history.

(56) References Cited

U.S. PATENT DOCUMENTS 5,758,057 A    5/1998  Baba et al.
5,812,754 A    9/1998  Lui
5,872,906 A    2/1999  Morita (Continued)

FOREIGN PATENT DOCUMENTS

EP            11095933         4/1999

(Continued)

OTHER PUBLICATIONS

"Hard Disk Drive Specification Deskstar 7K250", Hitachi, Ltd.

(Continued)

*Primary Examiner*—Niketa I Patel
(74) *Attorney, Agent, or Firm*—Mattingly, Stanger, Malur & Brundidge, P.C.

(57) ABSTRACT

The present invention aims to provide a high-reliability, low-cost disk array by emulating an ATA drive so that it can be used in the same way as an FC drive. To achieve this object, a disk array system of the present invention includes: a storage device having a logical unit logically set therein; the storage device includes: a plurality of disk devices having a first interface; and an interface converter converting between signals of the first interface adapted for the disk device and signals of a second interface adapted for the control device. The interface converter includes: a response time monitor portion for monitoring a time until a response is received from the disk device according to the data input/output request; and a notification issue portion for issuing to the control device a notification about an operative state of the disk device according to the monitored response time.

12 Claims, 9 Drawing Sheets

U.S. PATENT DOCUMENTS

| | | |
|---|---|---|
| 5,923,876 A | 7/1999 | Teague |
| 6,115,771 A | 9/2000 | Born |
| 6,434,711 B1 | 8/2002 | Takiyanagi |
| 6,442,711 B1 | 8/2002 | Sasamoto |
| 6,618,788 B1 | 9/2003 | Jacobs |
| 6,643,734 B2 * | 11/2003 | Mabuchi et al. ............ 711/114 |
| 6,862,648 B2 * | 3/2005 | Yatziv ........................ 710/315 |
| 2002/0062387 A1 | 5/2002 | Lam et al. |
| 2002/0069377 A1 | 6/2002 | Mabuchi et al. |
| 2002/0174297 A1 | 11/2002 | McDonald et al. |
| 2004/0064598 A1 | 4/2004 | Nakano |
| 2004/0078707 A1 | 4/2004 | Apperley et al. |
| 2004/0093551 A1 | 5/2004 | Asano |
| 2004/0117522 A1 | 6/2004 | Loffink et al. |

FOREIGN PATENT DOCUMENTS

| | | |
|---|---|---|
| EP | 1 191 431 | 3/2002 |
| EP | 1486863 | 12/2004 |
| JP | 11-95933 | 4/1999 |
| JP | 2001-356880 | 12/2001 |

OTHER PUBLICATIONS

"Serial ATA Quick Tutorial", source: Addonics.
"Hard Disk Drive Specification Deskstar 7K250", Hitachi, Ltd.
"Serial ATA Quick Tutorial", source: Addonics.

* cited by examiner

DISK ARRAY SYSTEM AND INTERFACE CONVERTER

The present application is a continuation of application Ser. No. 10/861,792, filed Jun. 7, 2004, now U.S. Pat. No. 7,080,167, the contents of which are incorporated herein by reference.

BACKGROUND OF THE INVENTION

The present invention relates to a disk array system, particularly, to a disk array system adapted for a simple interface such as an ATA interface.

Recently, instead of FC (Fibre Channel) drives and SCSI (Small Computer System Interface) drives conventionally used, low-cost ATA (AT Attachment) drives designed for personal computers have been frequently used in disk arrays for backups/archives. The ATA drive executes an automatic reassignment for automatically assigning data of a bad sector to another sector. A retry is executed many times to succeed in accessing disks (for example, see "Hard Disk Drive Specification Deskstar 7K250", Hitachi Ltd., 13 Aug. 2003.

On the other hand, in conventional disk arrays using the FC drives and SCSI drives, to increase their reliability, symptom of failure of the drives is monitored, and when many bad sectors occur, preventive copy is executed. The disk controller monitors the number of occurrences of the bad sectors to detect a trigger of this preventive copy.

SUMMARY OF THE INVENTION

Because the above-described ATA drive, when used in the disk array system, executes the automatic reassignment for automatically assigning data of a bad sector to another sector, the disk array controller cannot recognize the number of occurrences of the bad sectors. Therefore, the preventive copy cannot be executed before many bad sectors occur.

Additionally, because retries are executed many times in the above-described ATA drive, a response to an IO request (data input/output request) is delayed, and thus a timeout for a host can occur. When an internal retry is stopped in its duration to avoid the timeout, alternative sectors for the bad sectors are not prepared, and thus the automatic reassignment is not executed.

An object of the present invention is to increase reliability of low-cost disk arrays by emulating the ATA drive so that ATA drive can be used in the same way as the FC drive.

The present invention includes: a storage device having a logical unit logically set therein; and a control device connecting to a host which requires data input/output and inputting/outputting the data into/from the storage device according to the request from the host. The storage device includes: a plurality of disk devices having a first interface; and an interface converter for converting between signals of the first interface adapted for the disk device and signals of a second interface adapted for the control device. The interface converter includes: a response time monitor portion for monitoring a time until a response to the data input/output request is received from the disk device; and a notification issue portion for issuing to the control device a notification about the operative state of the disk devices to the control device according to the monitored response time.

According to the present invention, the ATA drive can be used in the same way as the FC drive, thereby providing a low-cost, and high-reliability disk array.

DETAILED DESCRIPTION OF THE PREFERRED EMBODIMENTS

Embodiments of the present invention are explained in the following with reference to the drawings.

Figure 1:
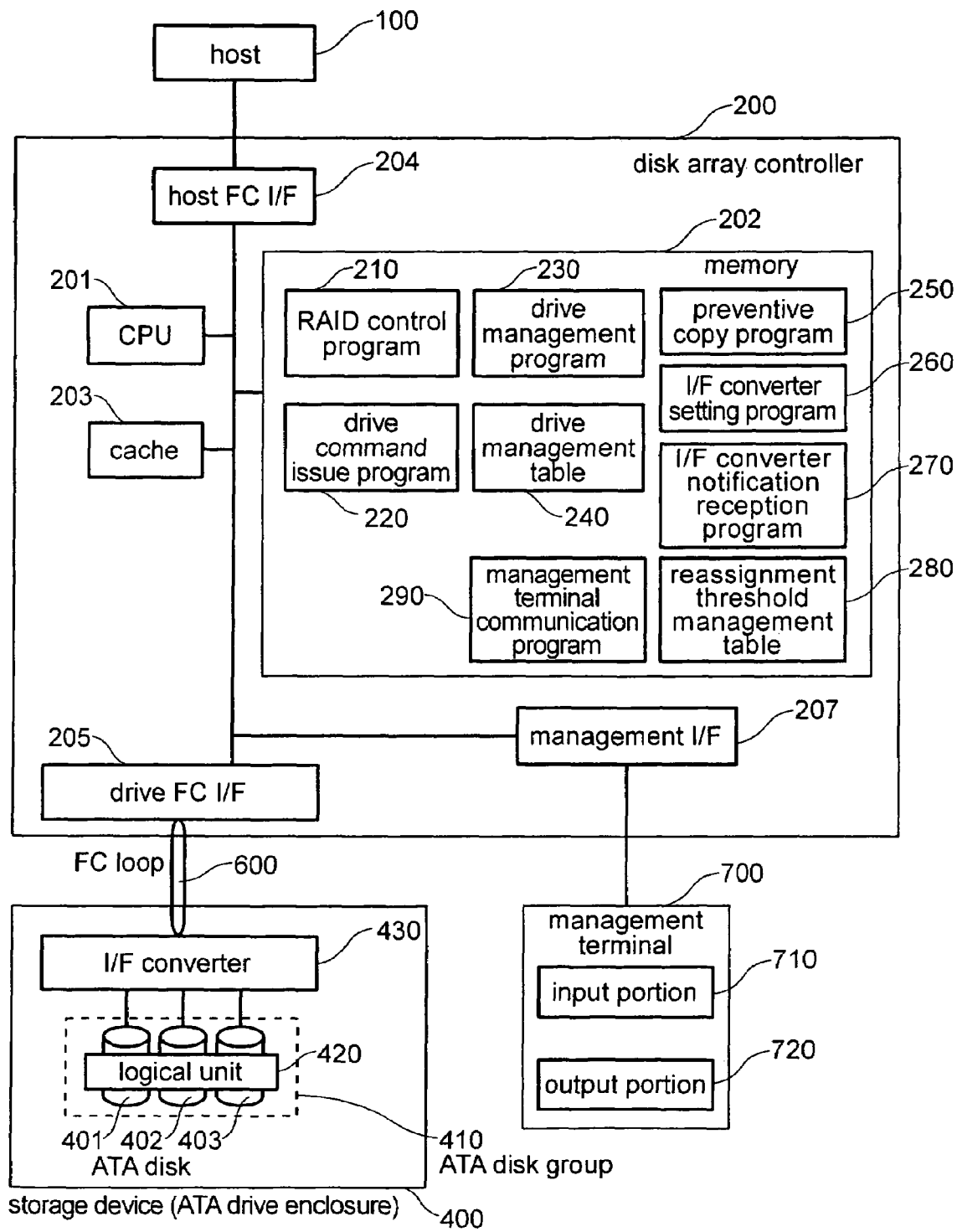
FIG. 1 is a block diagram showing an overall structure of a disk array system of a first embodiment.

FIG. 1 is a block diagram showing an overall structure of a disk array system of a first embodiment of the present invention.

As shown in FIG. 1, the first embodiment includes a host 100, a disk array controller 200, a storage device 400, and a management terminal 700.

The disk array controller 200 provides information stored in the storage device 400 to the host 100 connected thereto via a host FC interface 204. The disk array controller 200 includes one or more CPUs 201, a memory 202, a cache 203, one or more host interfaces 204, one or more drive FC interfaces 205, and a management interface 207.

The memory 202 stores a RAID control program 210, a drive command issue program 220, a drive management program 230, a drive management table 240, a preventive copy program 250, an I/F converter setting program 260, an I/F converter notification reception program 270, and a management terminal communication program 290. The CPU 201 calls and executes these programs to execute various processes. The memory 202 also stores a reassignment threshold table 280.

The cache 203 temporarily stores data exchanged between the host FC interface 204 and the drive FC interface 205.

The host FC interface 204 transmits/receives signals (commands, data) to/from the host 100 according to the Fibre Channel protocol. The host FC interface 204 is connected to the host computer 100.

The drive FC interface 205 transmits/receives signals (commands, data) to/from the storage device 400 according to the Fibre Channel protocol. This drive FC interface 205 is connected to the storage device 400 via a Fibre Channel loop (FC loop) 600.

The management interface 207 transmits/receives data and commands according to, e.g., the TCP/IP protocol. This management interface 207 is connected to the management terminal 700. The management terminal 700 includes an input portion 710 and an output portion 720, and inputs/outputs management information of the storage device 400 to/from the management terminal 700.

The RAID control program 210 controls the operations of a RAID comprised of a plurality of ATA disks 401 to 403. In other words, data is distributively stored in a plurality of disks, and read to be reconstructed. If one disk is failed, missing data is recovered by an error correction function (correction) (see FIG. 6).

The drive command issue program 220 issues commands for the ATA disks 401 to 403. The drive management program 230 manages states of the ATA disks 401 to 403 by use of the drive management table 240, and recovers various failures.

Figure 7:
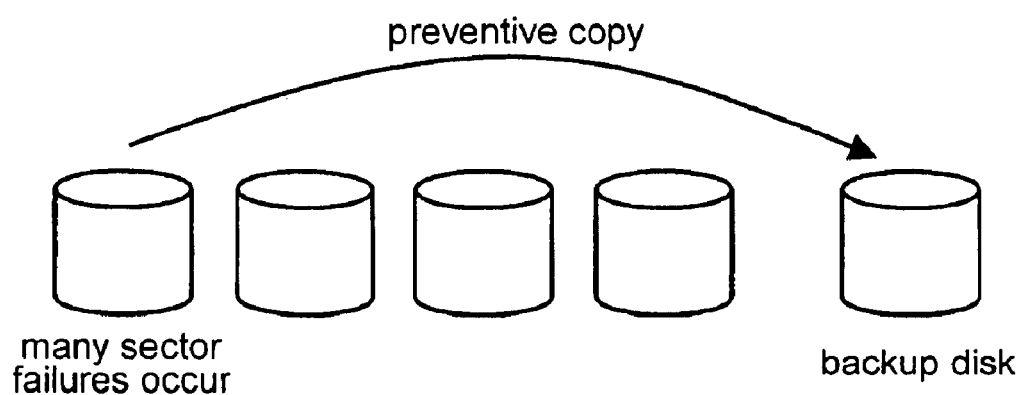
FIG. 7 is an explanation view of a preventive copy process of the first embodiment.

The preventive copy program 250 copies storage contents of the ATA disks 401 to 403 in which many bad sectors occur to a backup disk (see FIG. 7). The I/F conversion setting program 260 sets an operative condition of the I/F converter 430 according to a condition which is set by the management terminal 700.

Figure 5:
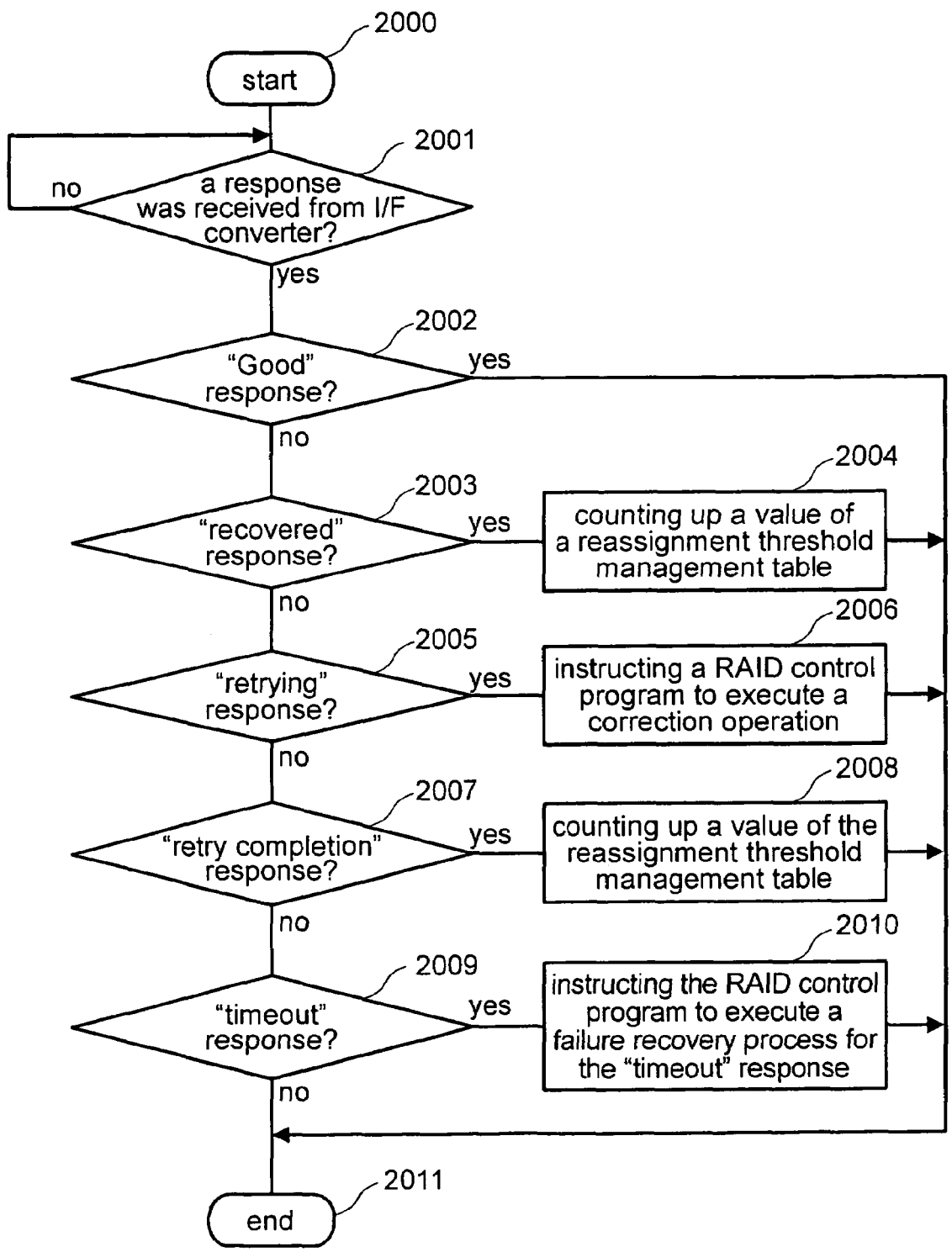
FIG. 5 is a flowchart of a failure recovery process of the first embodiment.

The I/F converter notification reception program 270 receives notifications issued by the I/F converter 430 according to operative states of the ATA disks 401 to 403 (see FIG. 5). The reassignment threshold management table 280 stores and manages the number of occurrences of the reassignments and thresholds used for judging whether many bad sectors occur.

The management terminal communication program 290 controls an operation of the management interface 207.

The storage device 400 includes an ATA disk group 410 having a plurality of ATA disks and an I/F converter 430, and is contained in an ATA drive enclosure.

The ATA disk group 410 includes a plurality of the ATA disks 401 to 403, in which a logical unit (LU) 420 is set. The logical unit 420 is a storage area which is logically set to the storage sources (ATA disks) contained in the storage device 400. The RAID (Redundant Array of Independent Disks) is formed of a plurality of the ATA disks 401 to 403 so that data stored in the disk group 410 is not erased even when part of the disks is failed.

Figure 2:
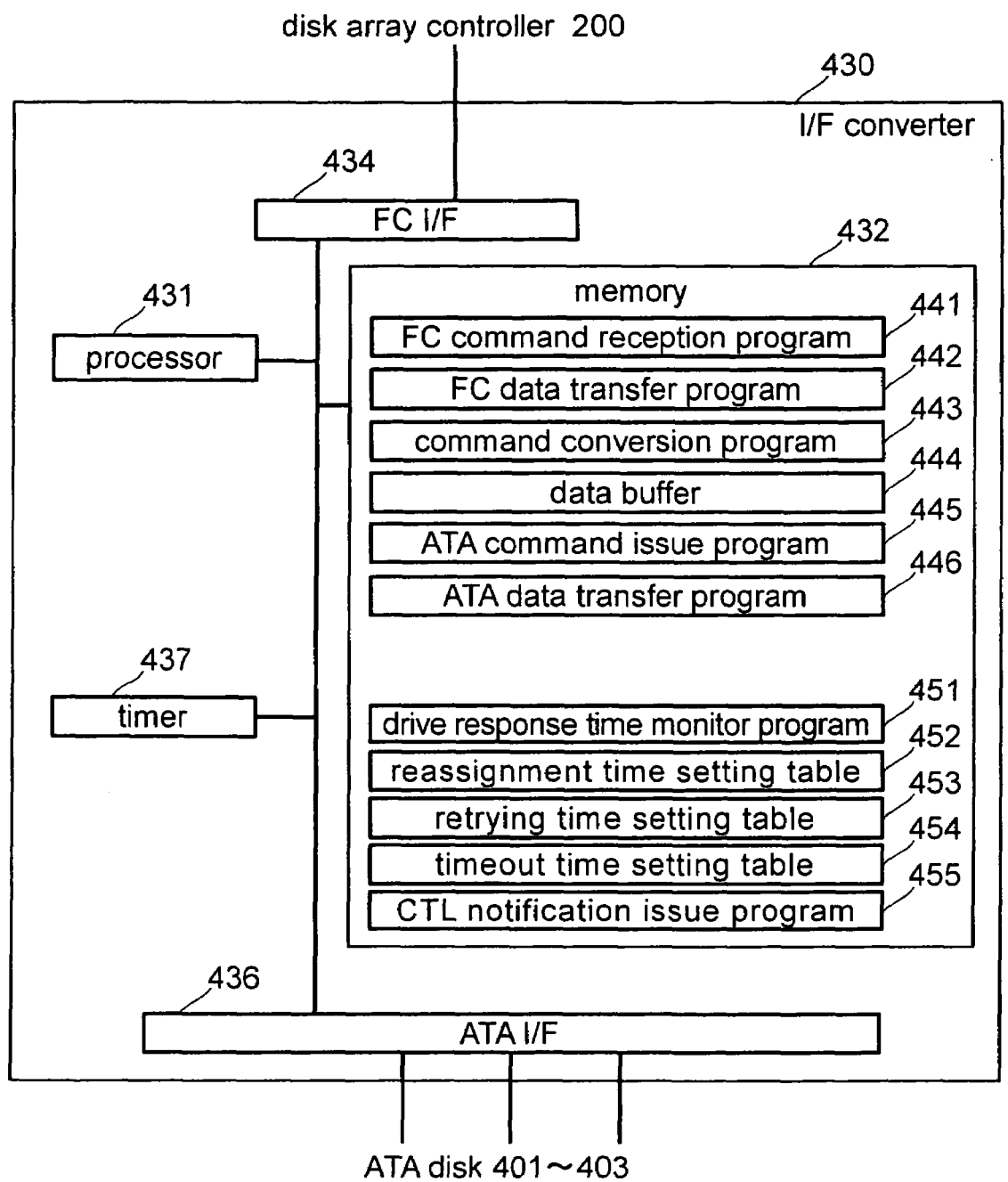
FIG. 2 is a block diagram showing a structure of an I/F converter of the first embodiment.

The I/F converter 430 converts between the Fibre Channel protocol for the disk array controller 200 and the ATA protocol for the ATA disks 401 to 403, and has a structure shown in FIG. 2. The I/F converter 430 can also be structured to convert not only between the Fibre Channel protocol and ATA protocol used in this embodiment but also between other protocols to complement different functions between the protocols.

The I/F converter 430 includes a processor 431, a memory 432, a FC interface 434, an ATA interface 436, and a timer 437. Various programs are stored in the memory 432. The processor 431 calls and executes these programs to execute various processes.

The FC interface 434 transmits/receives signals (commands, data) to/from the disk array controller 200 according to the Fibre Channel protocol. The ATA interface 436 transmits/receives signals (commands, data) to/from the ATA disks 401 to 403 according to the ATA channel protocol.

The memory 432 stores: an FC command reception program 441 for receiving commands transmitted from the disk array controller 200 according to the Fibre Channel protocol; a command conversion program 443 for converting commands to ones defined by a different protocol (in this embodiment, from the Fibre Channel protocol to the ATA protocol); an ATA command issue program 445 for issuing commands defined by the ATA protocol to the ATA disks 401 to 403; an FC data transfer program 442 for transmitting/receiving data according to the Fibre Channel protocol; an ATA data transfer program 446 for transmitting/receiving data according to the ATA channel protocol; and a data buffer 444 for temporarily storing the received data.

Further, the memory 432 stores a drive response time monitor program 451, a reassignment time setting table 452, a retrying time setting table 453, a timeout time setting table 454, and a CTL notification issue program 455.

The drive response time monitor program 451, according to a clock signal provided from the timer 407, monitors an elapsed time since the ATA command issue program 445 has issued a command. When the drive response time monitor program 451 judges that a predetermined time has elapsed since the disk array controller 200 issued the command, the CTL notification issue program 455 issues a notification to the disk array controller 200. The reassignment time setting table 452, retry duration time setting table 453, and timeout time setting table 454 are used for judging the lapsed time. Times defined in each table 452 to 454 can be set equally or differently to each the ATA disks 401 to 403.

Figure 3:
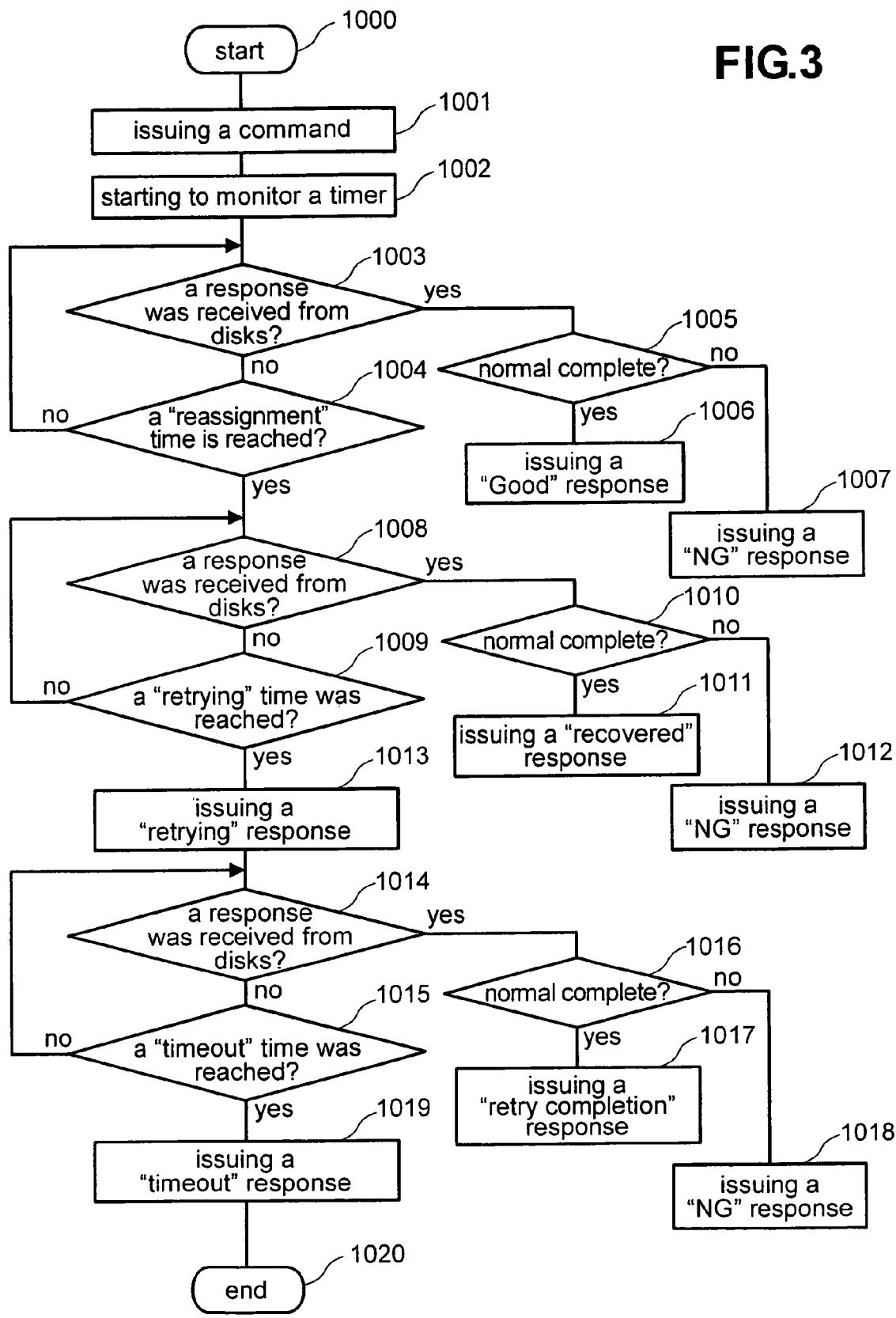
FIG. 3 is a flowchart of a response time monitor process of the first embodiment.
Figure 4:
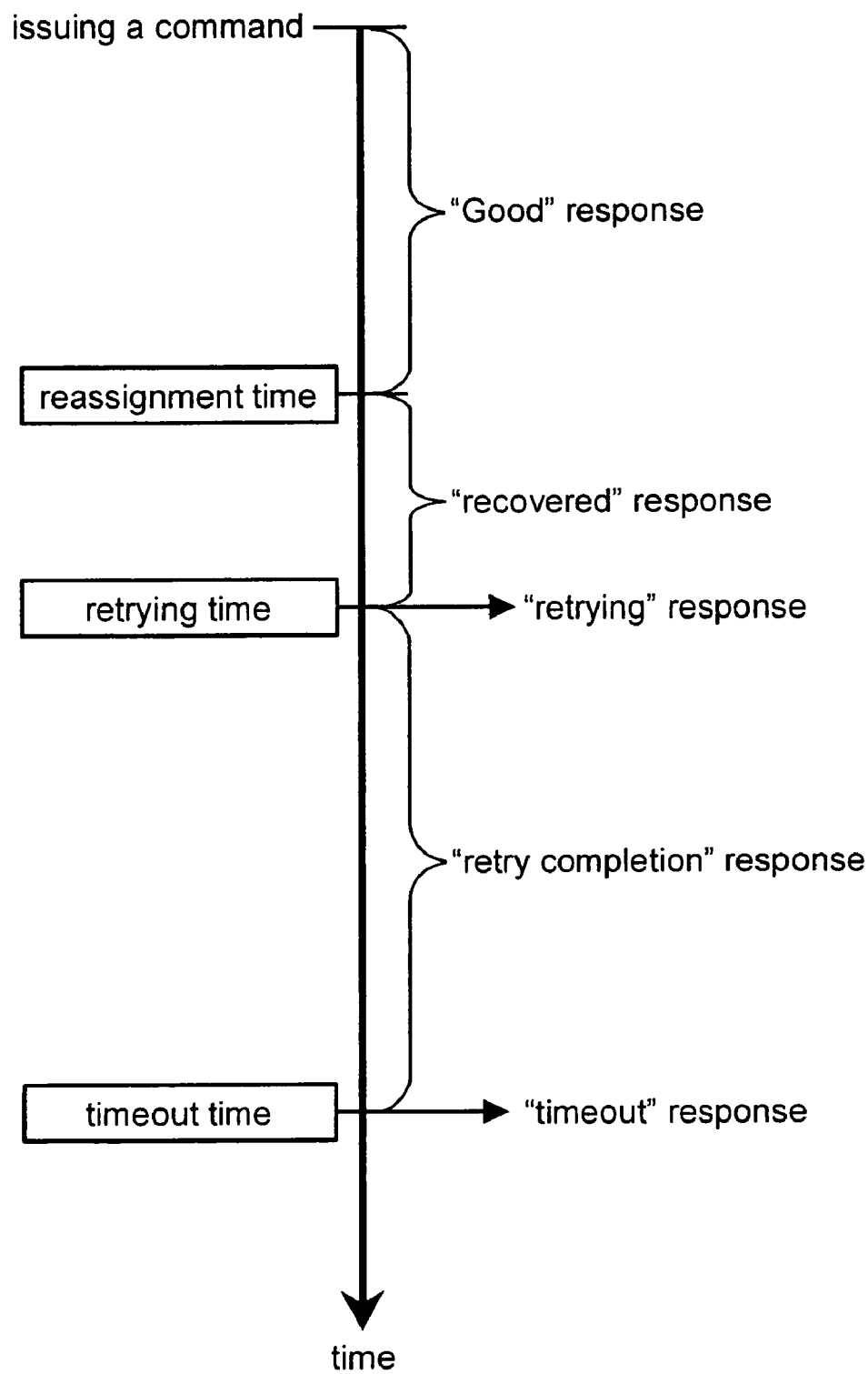
FIG. 4 is a timing chart of the response time monitor process of the first embodiment.

FIG. 3 is a flowchart of a response time monitor process executed by the drive response time monitor program 451. FIG. 4 is a timing chart of the response time monitor process.

When a command is issued from the disk array controller 200 to the ATA disks 401 to 403, the command is received in the FC interface 434, and the FC command reception program 441 analyzes the command. Then, the command conversion program 443 converts the command protocol from the Fibre Channel protocol to the ATA protocol, and the ATA command issue program 445 issues an ATA command (1001). The ATA interface 436 transmits the issued ATA command to the ATA disks 401 to 403.

The drive response time monitor program 451 starts to monitor the response time since the ATA command is issued (1002). Then it is judged whether a response was received from the ATA disks 401 to 403 (1003). When no response has been received from the ATA disks 401 to 403, it is judged whether a reassignment time which is set in the "reassignment" time setting table 452 is reached (1004). When the reassignment time is not reached, the process returns to step 1003, and the response from the ATA disks 401 to 403 is further monitored.

On the other hand, when the response is received from the ATA disks 401 to 403 before the reassignment time is reached, it is judged whether the response is a normal complete response (1005). When the response is the normal complete response, it is judged that a retry is not executed in the ATA disks, and a "Good" response is issued to end this response time monitor process (1006). When the response is not the normal complete response, it is judged that a failure occurs in the ATA disks, and a "NG" response is issued to end this response time monitor process (1007).

On the other hand, when no response was received from the ATA disks 401 to 403 until the reassignment time is reached, it is judged that the ATA disks have started an automatic reassignment. Then, the process goes to the next step (1008).

In step 1008, it is further judged whether a response has been received from the ATA disks 401 to 403. When no response has been received from the ATA disks 401 to 403, it is judged whether a retrying time which is set in the retrying time setting table 453 was reached (1009). When the retrying time is not reached, the process returns to step 1008, and a response from the ATA disks 401 to 403 is monitored.

On the other hand, when a response is received from the ATA disks 401 to 403 before the retrying time is reached, it is judged whether the response is a normal complete response (1010). When the response is the normal complete response, it is judged that data has been normally read from the ATA disks by means of the retry operation, and then a "recovered" response is issued to end this response time monitor process (1011). When the response is not the normal complete response, it is judged that a failure has occurred in the ATA disks, and then an "NG" response is issued to end this response time monitor process (1012).

On the other hand, when no response is received from the ATA disks 401 to 403 until the retrying time is reached, it is judged that the retry is under execution in the ATA disks 401 to 403, and a "retrying" response is transmitted to the disk array controller 200 (1013). Then, the process goes to the next step 1014.

In step 1014, it is judged whether a response was received from the ATA disks 401 to 403. When no response has been received from the ATA disks 402 to 403, it is judged whether a timeout time which is set in the timeout time setting table 454 was reached (1015). When the timeout time was not reached, the process returns to step 1014, and the response from the ATA disks 401 to 403 is monitored.

On the other hand, when a response is received from the ATA disks 401 to 403 before the retrying time is reached, it is judged whether the response is a normal complete response (1016). When the response is the normal complete response, it is judged that the automatic reassignment has been normally executed in the ATA disks, and a "retry completion" response is issued to end this response time monitor process (1017). When the response is not the normal complete response, it is judged that a failure occurs in the ATA disks, and an "NG" response is issued to end this response time monitor process (1018).

On the other hand, no response has been received from the ATA disks 401 to 403 after the timeout time was reached, it is judged that a failure has occurred in the ATA disks. Then, a "timeout" response is transmitted to the disk array controller 200 (1019) to end this response time monitor process (1020).

FIG. 4 is a timing diagram showing notifications issued according to time elapsed since a command is issued.

When a process completion response is received from the ATA disks 401 to 403 before the reassignment time is elapsed since an ATA command is issued by the ATA command issue program 445, it is judged that the retry is not under execution in the ATA disks, and a "Good" response is transmitted to the disk array controller 200.

After that, when the process completion response is received from the ATA disks 401 to 403 by the time that the retrying time has elapsed, it is judged that the retry has been executed in the ATA disks, and a "recovered" response is transmitted to the disk array controller 200.

After that, when the retrying time has been elapsed without the response from the ATA disks 401 to 403, the ATA disks 401 to 403 are judged to be under retrying, and a "retrying" response is transmitted to the disk array controller 200. In the disk array controller 200, a correction process is executed by the RAID control program 210 according to the "retrying" response (see FIG. 6).

After that, when a process completion response is received from the ATA disks 401 to 403 by the time that a timeout time has elapsed, it is judged that the automatic reassignment has been executed in the ATA disks, and a "retry completion" response is transmitted to the disk array controller 200.

After that, when the timeout time has been elapsed without a process completion response from the ATA disks 401 to 403, it is judged that a failure has occurred in the ATA disks 401 to 403, and a "timeout" time is transmitted to the disk array controller 200.

FIG. 5 is a flowchart of failure recovery process executed in the drive management program 230.

First, it is monitored whether a response was received from the I/F converter 430 (2001).

When the drive FC interface 205 receives a response from the I/F converter 430, it is judged whether the response is a "Good" response (2002). When the response is the "Good" response, no failure occurs in the ATA disks 401 to 403, and thus this failure recovery process ends.

On the other hand, when the response is not the "Good" response, it is further judged whether the response is a "recovered" response (2003). When the response is the "recovered" response, the automatic reassignment is under execution in the ATA disks 401 to 403, and therefore a value (the number of failure occurrences) of the reassignment threshold management table 280 is counted up (2004).

On the other hand, the response is not the "recovered" response, it is further judged whether the response is the "retrying" response (2005). When the response is the "retrying" response, the RAID control program 210 is instructed to read data from other disks so that data to be read from the ATA disks is reconstructed (see FIG. 6) in order to return a quick response to the host 100 (2006).

On the other hand, when the response is not the "retrying" response, it is further judged whether the response is the "retry completion" response (2007). When the response is the "retry completion" response, the automatic reassignment is executed in the ATA disks 401 to 403, and thus a value (the number of failure occurrences) is counted up (2008).

On the other hand, when the response is not the "retry completion" response, it is further judged whether the response is the "timeout" response (2009). When the response is the "timeout" response, a failure has occurred in the ATA drives 401 to 403, and thus the RAID control program 210 is instructed to execute the failure recovery process (2010). At this time, because it is anticipated that a failure resulting in timeout (e.g., hung-up) has occurred in the ATA disks 401 to 403 due to the issued command, the ATA drive which returns no response is initialized by a hard reset.

On the other hand, when the response is not the "timeout" response, it is not an assumed response, so that nothing is executed and this failure recovery process ends.

Figure 6:
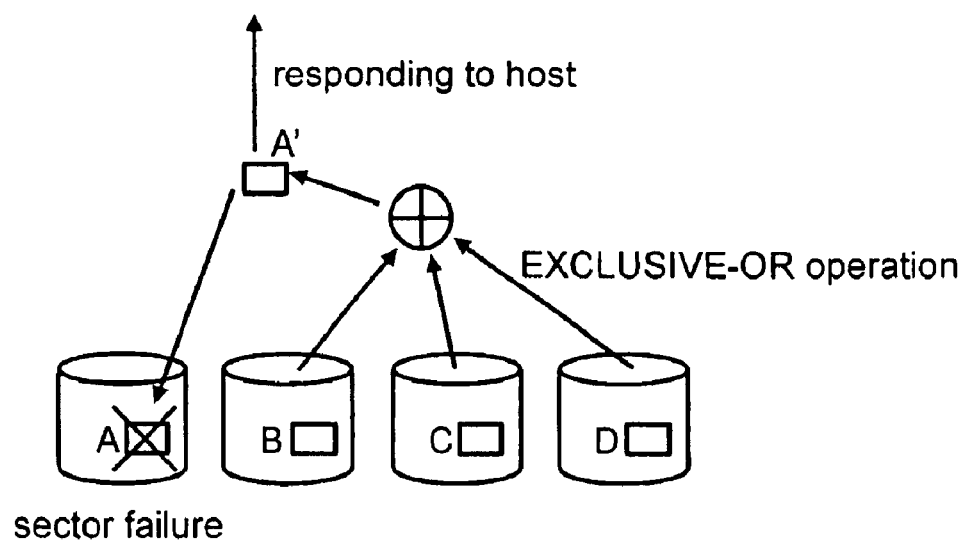
FIG. 6 is an explanation view of a correction process of the first embodiment.

FIG. 6 is an explanation view of a correction process executed by the RAID control program 210.

The correction process is as follows. As described above, when a failure occurs in a sector A of a disk shown in the leftmost, and a response from the disk is delayed, data is read from sectors B, C, and D in other disks forming the RAID, which sectors correspond to the sector A. The exclusive-OR of the read data is calculated to generate data A', which is the same as that stored in the sector A, and a response is transmitted to the host. The calculated data is written in the failed sector A (or a reassigned sector).

AS described above, even when the response from the disks is delayed by executing the retry many times in the disks, the data can be rapidly returned to the host by executing the correction process on receiving the "retrying" response. Therefore, the timeout in the host can be avoided. Additionally, a waiting time of the host can be reduced before the timeout, thus suppressing the delay of processes in the host.

FIG. 7 is an explanation view of a preventive copy process executed by the preventive copy program 250.

The preventive copy is preventively executed when bad sectors of the disks are judged to have increased according to the result of comparison between the number of the reassignments recorded in the reassignment threshold management table 280 by the drive management program 230 and a predetermined threshold (e.g., when the number of the reassignments is over the predetermined threshold). In other words, when many sectors are failed but the reading/writing is not completely impossible, storage contents of the disk where many sectors are failed are copied to backup disks.

As described above, in the first embodiment of the present invention, the interface converter 430 for converting between signals of the ATA interface adapted for the ATA disks 401 to 403 and signals of the Fibre Channel interface adapted for the disk array controller 200 is provided. As a result, the ATA drive can be used in the same way as the FC drive.

The interface converter 430 monitors whether a response to a data input/output request command is received from the ATA disks 401 to 403 by the reassignment time, and judges that the automatic reassignment is under execution in the ATA disks 401 to 403 when the response is received from the ATA disks 401 to 403 when the reassignment time is exceeded. Then, the "recovered" response is issued to the disk array controller 200. The drive management program 230 receives the "recovered" response to update the number of the reassignments in the disks, which number is recorded in the reassignment threshold management table 280. When the number recorded in the reassignment threshold management table 280 is over a predetermined threshold, bad sectors in the disks are judged to have increased, and thus the preventive copy is executed. In other words, by regarding the fact that a response time is delayed in the automatic reassignment, and by monitoring the response time, an occurrence of the automatic reassignment (occurrence of bad sectors) can be detected to execute the preventive copy by using the number of occurrences of bad sectors as a threshold.

When no response is received from the ATA disks 401 to 403 until the retrying time, the "retrying" response is issued to the disk array controller 200. When the drive management program 230 receives the "retrying" response, it reads data from other disks forming the RAID without waiting for a response from the ATA disks, reconstructs data (data correction) by use of the read data, and transmits the reconstructed data to the host 100. Meanwhile, the drive management program 230 causes the drive to be under the retry, and waits for the automatic reassignment due to success of the retry or an error response due to resignation of the retry. Therefore, prevention of the timeout of the host and the promotion of the automatic reassignment of the disks are compatible.

Figure 8:
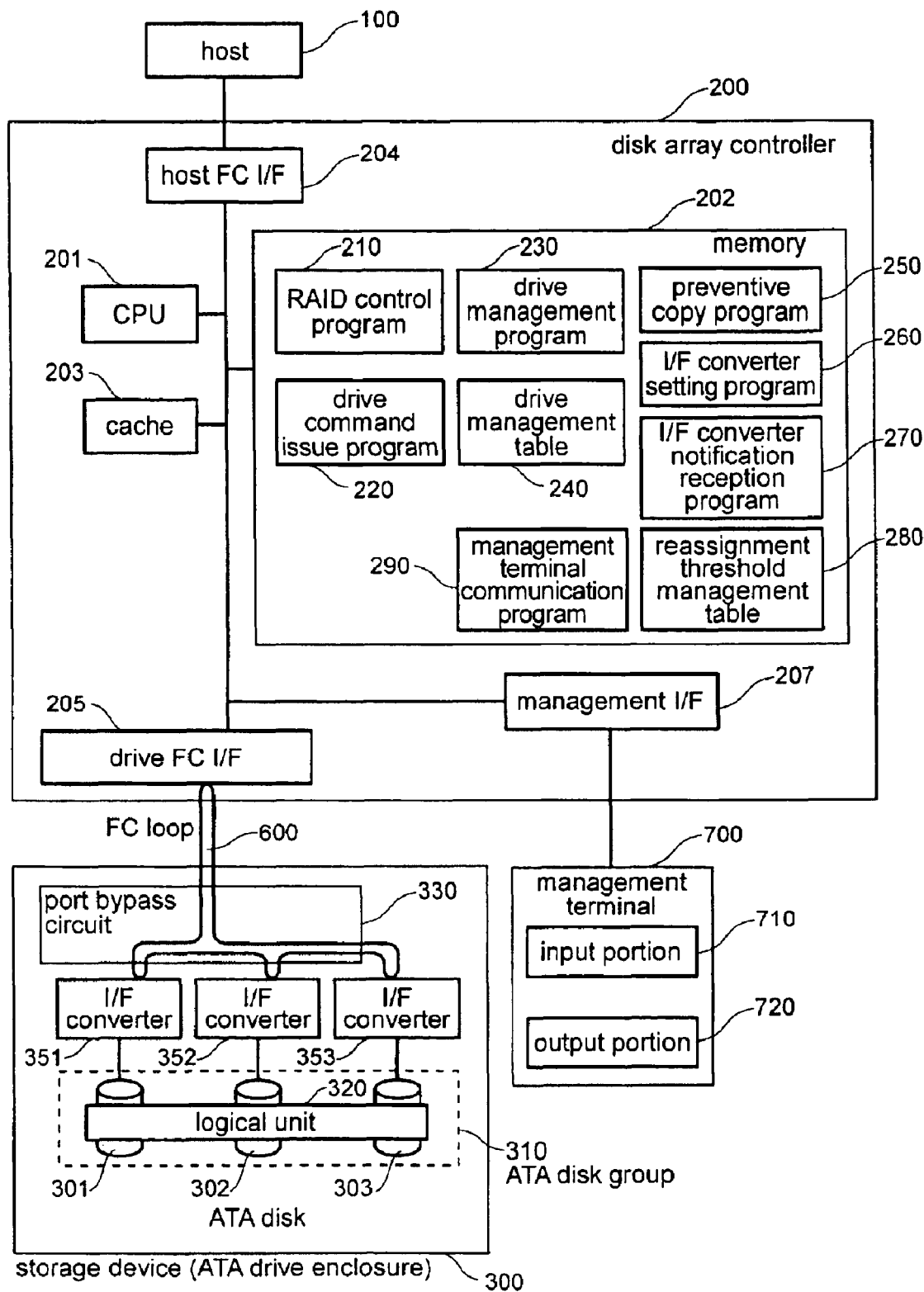
FIG. 8 is a block diagram showing an overall structure of a disk array system of a second embodiment.

FIG. 8 is a block diagram showing an overall structure of a disk array system of a second embodiment of the present invention.

The second embodiment is different from the above-described first embodiment (FIG. 1) in that the I/F converter is provided to each ATA disk in the second embodiment. The same components as the first embodiment are provided with the same numerals as those in the first embodiment, and not explained in detail.

A storage device 300 includes an ATA disk group 310 comprised of a plurality of ATA disks, I/F converters 351 to 353, and a port bypass circuit 330, and is contained in an ATA drive enclosure.

The ATA disk group 310 includes a plurality of ATA disks 301 to 303. A logical unit (LU) 320 is set in the ATA disks 301 to 303. A RAID is formed of a plurality of the ATA disks 301 to 303.

The I/F converters 351 to 353 convert between the Fibre Channel protocol for the disk array controller 200 and the ATA protocol for the ATA disks 301 to 303, and each includes the structure shown in FIG. 2. In the first embodiment, different times defined in each of the reassignment time setting table 452, retrying time setting table 453, and timeout time setting table 454 can be set to each of the ATA disks 301 to 303. In the second embodiment, because the I/F converters 351 to 353 are respectively connected to the ATA disks 301 to 303, each of the tables stores one value for each the ATA disk.

Figure 9:
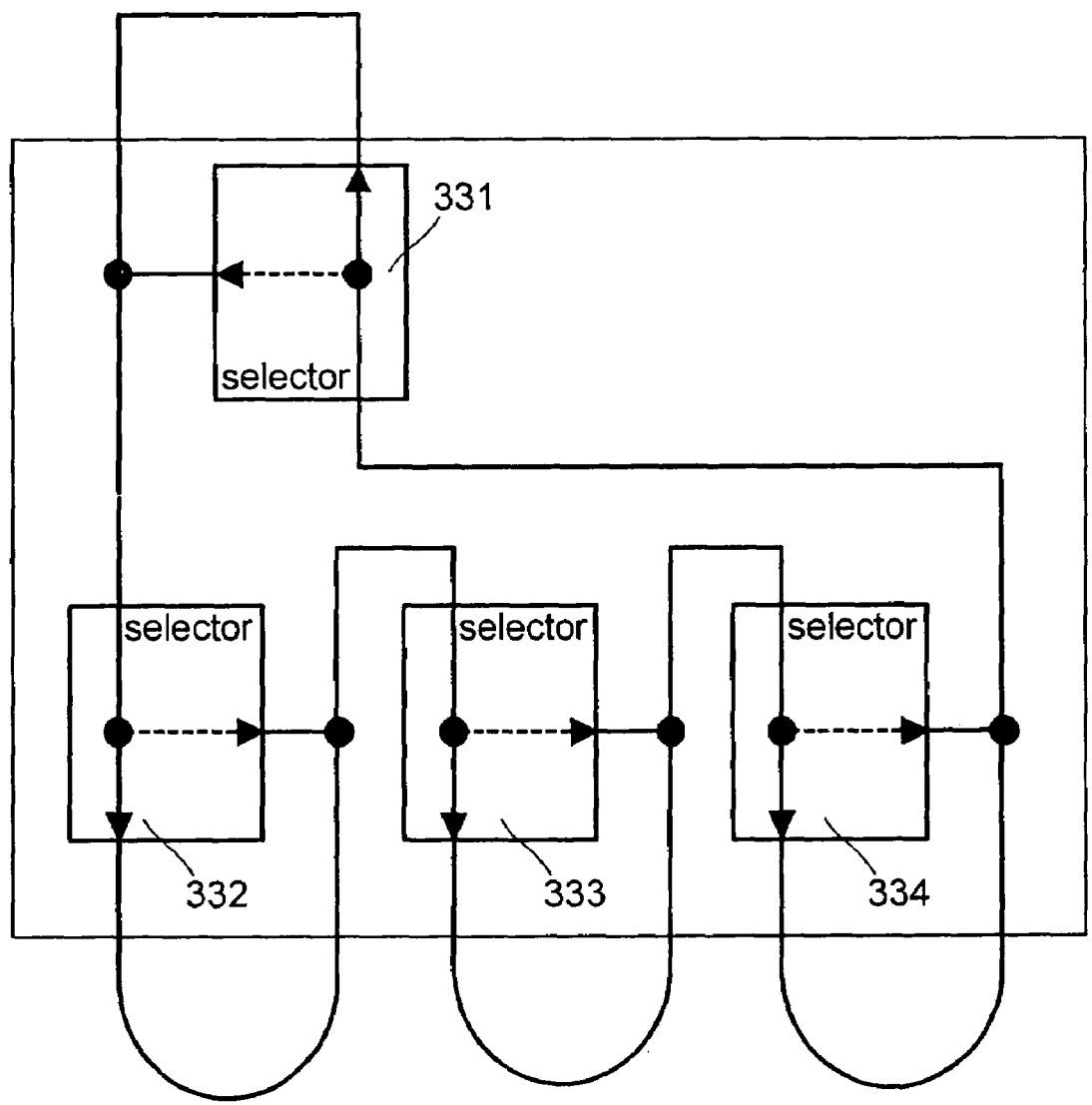
FIG. 9 is a block diagram showing a port bypass circuit of the second embodiment.

The port bypass circuit 330, as shown in FIG. 9, includes a plurality of selectors 331 to 334 corresponding to the number of the connected disks and controller. These selectors, in a normal state, are connected via the solid line. When a failure occurs in part of the disks or controller, the selectors are connected via the broken line to thereby disconnect the disks or controller having the failure from a Fibre Channel loop 600. Accordingly, the Fibre Channel loop 600 is not disconnected.

As described above, in the second embodiment of the present invention, in addition to the effect of the first embodiment, by combining the ATA disks 301 to 303 and the I/F converters 351 to 353 and removing them, the ATA drive and I/F converter can be converted to the FC drive. As a result, maintainability of the storage device can be enhanced.

Figure 10:
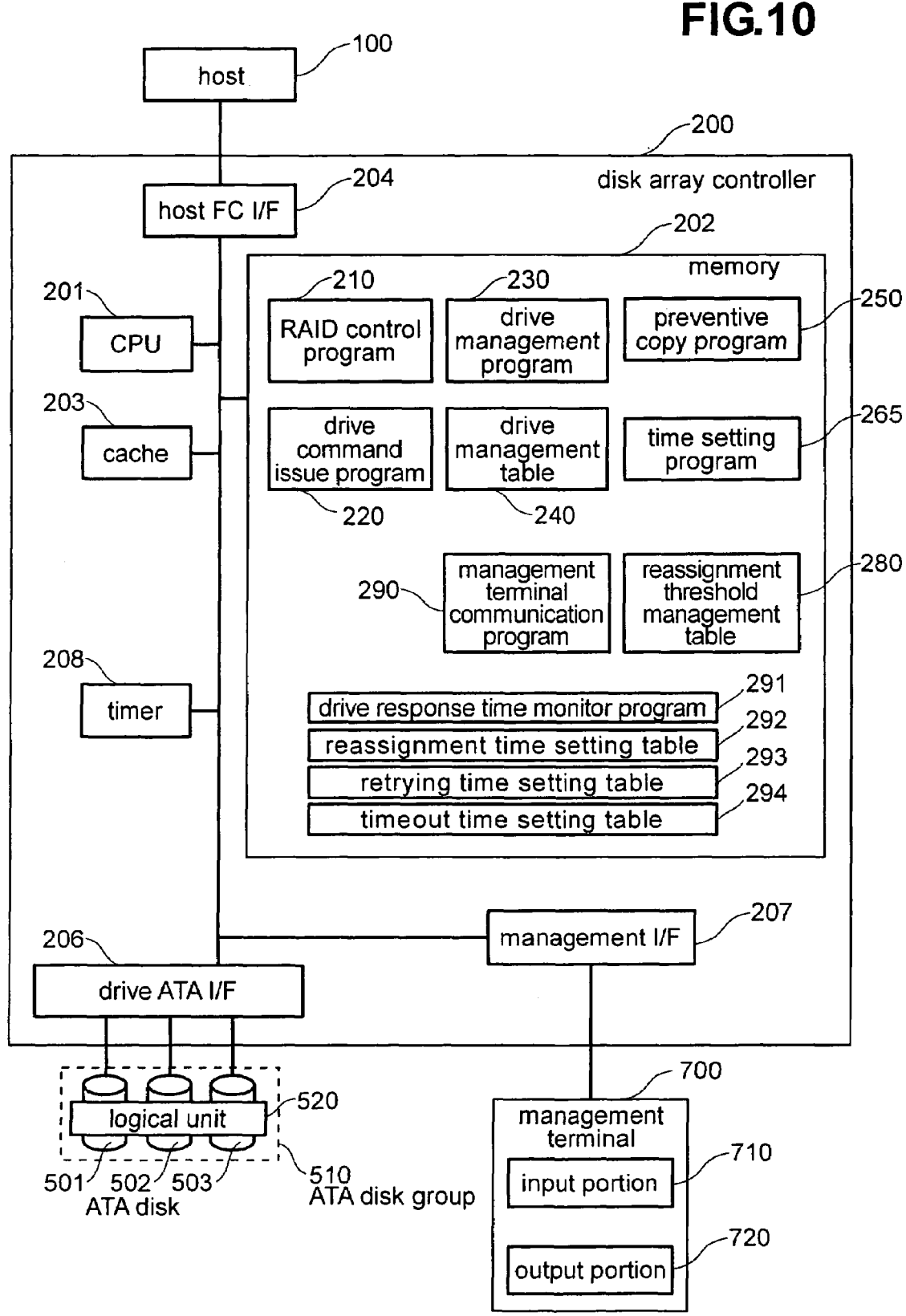
FIG. 10 is a block diagram showing an overall structure of a disk array system of a third embodiment.

FIG. 10 is a block diagram showing an overall structure of a disk array system of a third embodiment of the present invention.

The third embodiment is different from the first embodiment (FIG. 1) in that the I/F converter is provided in the disk array controller 200 in the third embodiment. The same components as the first embodiment are provided with the same numerals as the first embodiment, and not explained in detail.

The disk array controller 200 includes one or more CPUs 201, a memory 202, a cache 203, one or more host FC interfaces 204, one or more drive ATA interfaces 206, a management interface 207, and a timer 208. The disk array controller 200 provides information stored in the ATA disk group 510 to the host 100 connected thereto via the host FC interface 204.

The memory 202 stores a RAID control program 210, a drive command issue program 220, a drive management program 230, a drive management table 240, the preventive copy program 250, a time setting program 265, a reassignment threshold management table 280, and a management terminal communication program 290.

Further in the third embodiment, the memory 202 stores a drive response time monitor program 291, a reassignment time setting table 292, a retrying time setting table 293, and a timeout time setting table 294. These programs 291 to 294 function in the same way as the drive response time monitor program 451, reassignment time setting table 452, retrying time setting table 453, and timeout time setting table 454.

These programs are called and executed by the CPU 201 to execute various processes.

The time setting program 265 sets times stored in the reassignment time setting table 292, retrying time setting table 293, and timeout time setting table 294 referenced by the drive response time monitor program 291.

The ATA disk group 510 includes a plurality of ATA disks 501 to 503. A logical unit (LU) 520 is set in the ATA disks 501 to 503. The ATA disks 501 to 503 form a RAID.

As described above, in the third embodiment, in addition to the effect of the first embodiment, there is the following effect. Because the structure achieving the same function as the FC drive is provided in the disk array controller 200, a structure for the interface conversion does not need to be provided, thus contributing cost reduction of the storage device.

What is claimed is:

1. A disk array system comprising:
a plurality of disk devices for storing data; and
a disk array controller coupled to the plurality of disk devices,
wherein when a command is issued to one of the plurality of disk devices, the disk array controller measures a response time from issue of the command,
wherein when the disk array controller receives a response from the one of the plurality of disk devices between a first predetermined time and a second predetermined time, the disk array controller sends data from the one of the plurality of disk devices to a computer and increases a counter,
wherein when the response time is over the second predetermined time without receiving the response, the disk array controller executes a correction operation to generate data requested by the command based on a RAID configuration of the plurality of disk devices, and sends the data generated by the correction operation to the computer,
wherein when the disk array controller receives the response after the second predetermined time, the disk array controller increases the counter, and
wherein when a value of the counter exceeds a predetermined value, the disk array controller executes a copy operation to copy data from the one of the plurality of disk devices to another one of the plurality of disk devices.

2. A disk array system according to claim 1, wherein when the disk array controller receives the response before the first predetermined time, the disk array controller sends the data from the one of the plurality of disk devices without increasing the counter.

3. A disk array system according to claim 1, wherein when the response time is over a third predetermined time without receiving the response, the disk array controller resets the one of the plurality of disk receiving devices.

4. A disk array system according to claim 1, wherein when the response time is over a third predetermined time without receiving the response, the disk array controller executes an error recovery process for the one of the plurality of disk devices.

5. A disk array system according to claim 1, wherein the plurality of disk devices are ATA disk devices.

6. A disk array system according to claim 1, wherein each of the plurality of disk devices is configured to execute a reassignment process when an error sector is detected.

7. A method for responding to a command from a computer by a disk array system, the disk array system comprising:
a plurality of disk devices for storing data; and
a disk array controller coupled to the plurality of disk devices,
the method comprising steps of:
when a command is issued to one of the plurality of disk devices, measuring a response time;
when the disk array controller receives a response from the one of the plurality of disk devices between a first predetermined time and a second predetermined time, sending data from the one of the plurality of disk devices to a computer and increasing a counter;
when the response time is over the second predetermined time without receiving the response, executing a correction operation to generate data requested by the command based on a RAID configuration of the plurality of disk devices, and sending the data generated by the correction operation to the computer;
when the disk array controller receives the response after the second predetermined time, increasing the counter; and
when a value of the counter exceeds a predetermined value, executing a copy operation to copy data from the one of the plurality of disk devices to another one of the plurality of disk devices.

8. A method according to claim 7, wherein when the disk array controller receives the response before the first predetermined time, the disk array controller sends the data from the one of the plurality of disk devices without increasing the counter.

9. A method according to claim 7, wherein when the response time is over a third predetermined time without receiving the response, the disk array controller resets the one of the plurality of disk receiving devices.

10. A method according to claim 7, wherein when the response time is over a third predetermined time without receiving the response, the disk array controller executes an error recovery process for the one of the plurality of disk devices.

11. A method according to claim 7, wherein the plurality of disk devices are ATA disk devices.

12. A method according to claim 7, wherein each of the plurality of disk devices is configured to execute a reassignment process when an error sector is detected.

* * * * *